L. YAX.
HEN'S NEST.
APPLICATION FILED JULY 20, 1908.
905,267.
Patented Dec. 1, 1908.
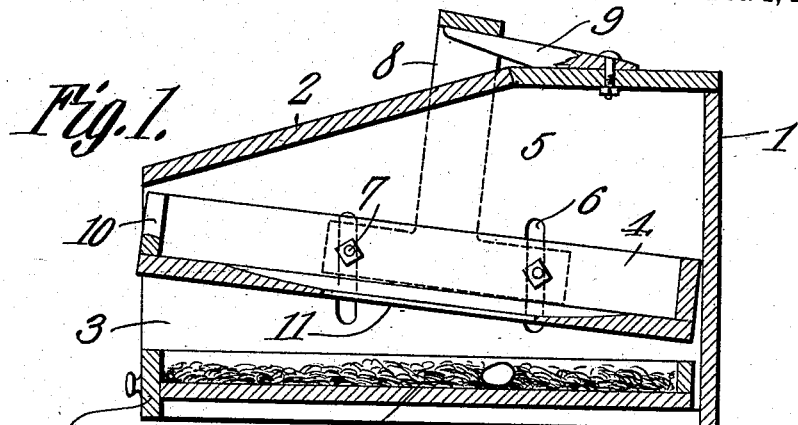
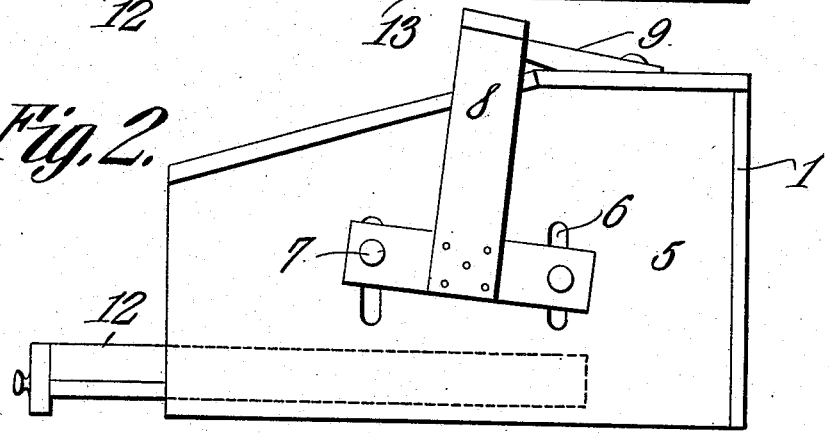
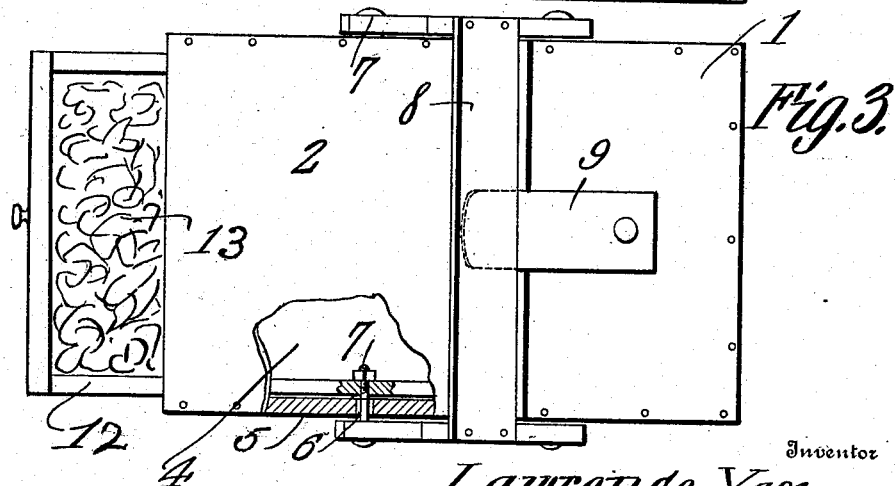
Inventor
Lawrence Yax.
By C. A. Snow & Co.
Attorneys
Witnesses

UNITED STATES PATENT OFFICE.

LAWRENCE YAX, OF CASEVILLE, MICHIGAN.

HEN'S NEST.

No. 905,267.  Specification of Letters Patent.  Patented Dec. 1, 1908.

Application filed July 20, 1908. Serial No. 444,384.

*To all whom it may concern:*

Be it known that I, LAWRENCE YAX, a citizen of the United States, residing at Caseville, in the county of Huron and State of Michigan, have invented a new and useful Hen's Nest, of which the following is a specification.

This invention has relation to hens' nests, and it consists of a novel construction and arrangement of its parts, as hereinafter shown and described.

The object of the invention is to provide a nest from which an egg may be removed while the hen is occupying the same, thereby affording means for removing the egg without unnecessarily disturbing the hen, and preventing the egg from becoming overheated by reason of the fact that otherwise the hen may remain too long upon the same, or, should the hen leave the nest, another hen may assume position over the egg.

With this object in view, the nest consists of a housing in which is located a vertically adjustable or movable tray, having an opening in its bottom. A sliding drawer is located under the tray, and is provided with a soft material, which forms an egg-receiving cushion. A bail handle is attached to the tray, and is located upon the outer side of the housing, and a button is pivotally attached to the housing and may be swung under the said handle, for the purpose of holding the same and the tray in an elevated position.

In the accompanying drawings:—Figure 1 is a longitudinal section view of the hen's nest. Fig. 2 is a side elevation of the same, and Fig. 3 is a top plan view of the same with parts broken away.

The nest consists of the housing 1, which is provided with the inclined top section 2, which forms part of the roof. The said housing 1, is open at the side 3, but is closed at all of its other sides. The tray 4, fits snugly within the housing 1, and may move vertically therein. The housing is provided in its sides 5, with the elongated slots, 6, which are vertically disposed. The pins 7, are attached to the sides of the tray 4, and pass through the slots 6. The ends of the bail handle 8, are attached to the outer end portions of the pins 7, and the intermediate portion of the said bail passes over the top of the housing 1. A button 9, is pivotally mounted upon the top of the housing 1, and is adapted to be swung under the intermediate portion of the bail 8, and when so positioned is adapted to hold the bail in an elevated position. The outer side of the tray 4, is recessed as at 10, and through said recess the hen may make entrance into and exit from the interior of the housing 1. The bottom of the tray 4, is dished, or concaved, and is provided with an opening 11. The drawer 12, fits snugly in the lower portion of the housing 1, and is provided upon its bottom with a cushioning material 13.

The nest may be manipulated as follows:—When the hen enters the tray 4, a person may approach the housing 1, from the rear, and, by lifting the bail 8, the tray 4, will be elevated slightly; then, by turning the button 9, so that its end will project under the intermediate portion of the bail 8, said bail and the tray 4, will be held in an elevated position. By elevating the tray 4, the opening at the side 3, of the housing will be reduced to such an extent that the hen cannot get out, nor can another hen enter. As soon as the egg is deposited the drawer 12, may be drawn out of the housing 1, and the egg may be removed without disturbing the hen. Thus the egg may be removed from beneath the hen before it is heated to a damaging extent. Then, when it is desired to place a setting of eggs under the hen (the hen having first entered within the housing 1, and upon the tray 4) a setting of eggs is placed in the drawer 12, and the said drawer is slipped in under the tray 4. When the drawer is in position, the operator lowers the bail 8, and the tray 4, and thus the hen is brought into direct contact with the setting of eggs located upon the cushioning material upon the bottom of the said drawer 12. Thus it will be seen that a convenient nest is provided, which may be moved from place to place, and one wherein the eggs will not become broken when deposited therein; and it will also be seen that the eggs will immediately descend into the drawer below the tray, and may be removed, so that the egg may not become heated by another fowl entering the housing. It will be further seen that I have so constructed my improved nest that the several parts thereof may be readily removed from the housing, thoroughly cleansed and sterilized.

Having described my invention, what I claim is new, and desire to secure by Letters Patent is:—

1. A nest comprising a housing having in its sides vertically disposed slots, a tray located within the housing and having in its bottom an opening, a drawer fitting within the housing and located below the tray, pins carried by the tray which project through the slots in the side of the housing, and a bail handle attached to said pins and passing over the top of the housing.

2. A nest comprising a housing having in its sides vertically disposed slots, a tray located within the housing, and provided in its bottom with an opening, a drawer fitting within the housing and located below the tray, a bail passing over the top of the housing, pins attached to the sides of the tray and passing through the slots in the housing and connected with the ends of the bail, and a button pivoted to the top of the housing and adapted to swing under the intermediate portion of the said bail.

In testimony that I claim the foregoing as my own, I have hereto affixed my signature in the presence of two witnesses.

LAWRENCE YAX.

Witnesses:
  ALEX. GUYEAU,
  IRA BARR.